F. H. GROVE.
WEB TENSIONING DEVICE FOR TIRE MAKING MACHINES.
APPLICATION FILED DEC. 16, 1915.
1,218,763.
Patented Mar. 13, 1917.
5 SHEETS—SHEET 1.
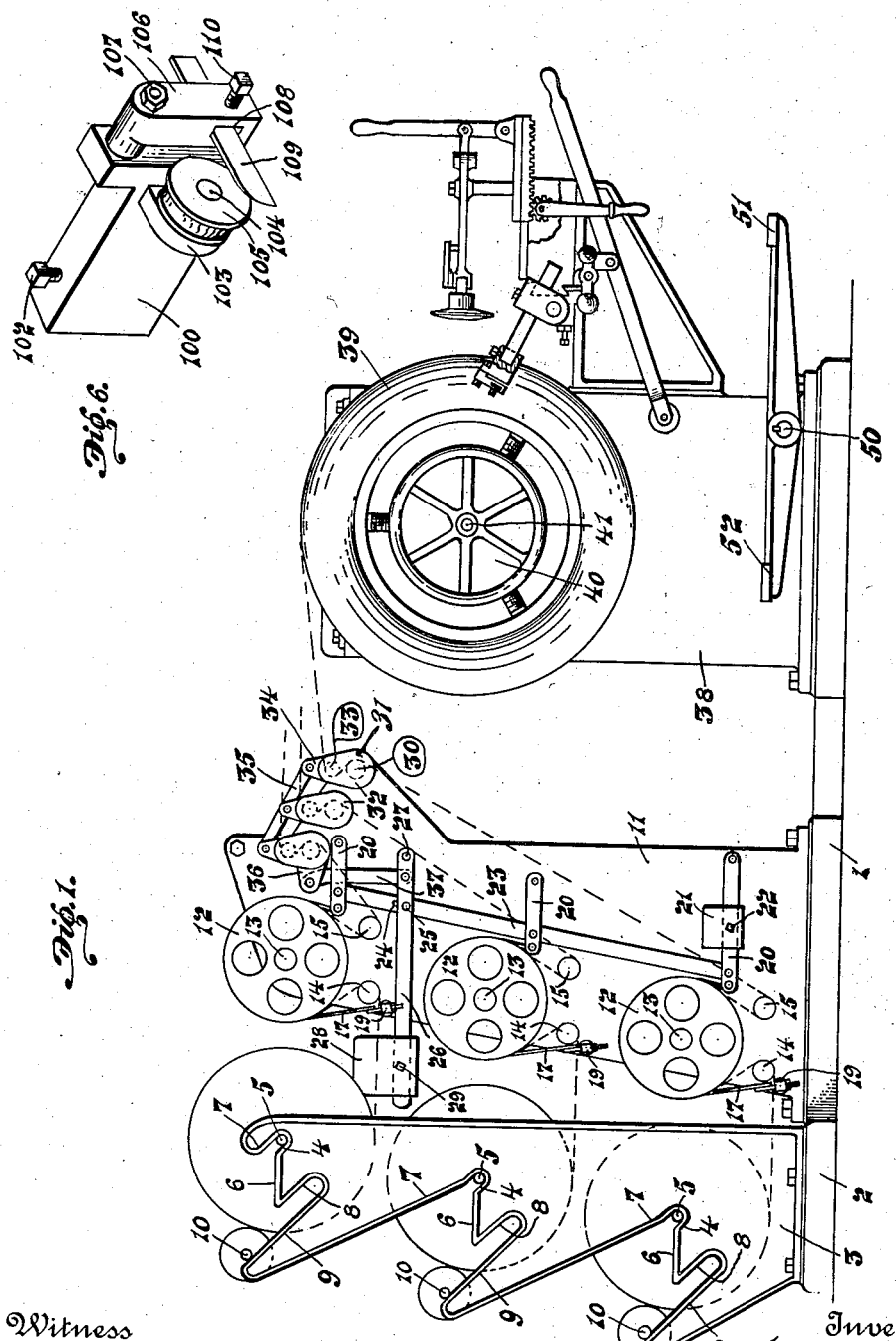
Witness
Robert O. Karcher.
Inventor
Frank H. Grove.
By
F. W. Bond
Attorney

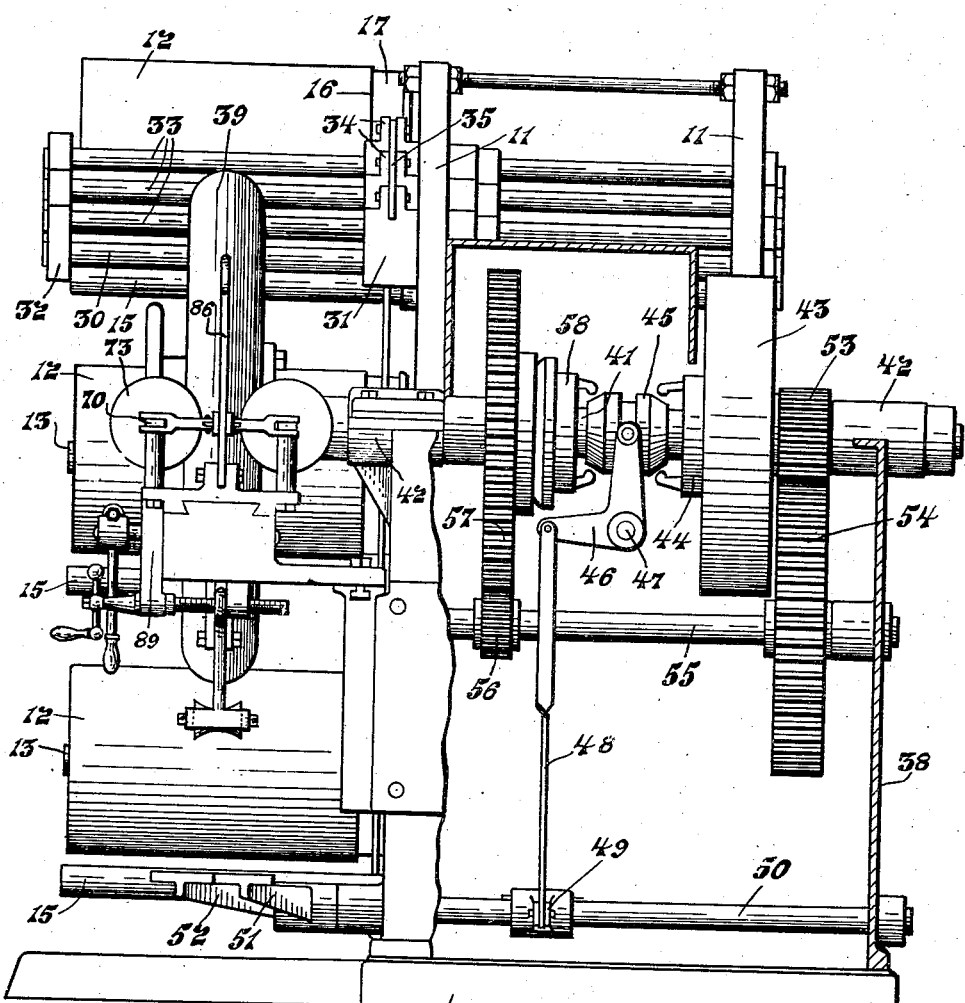

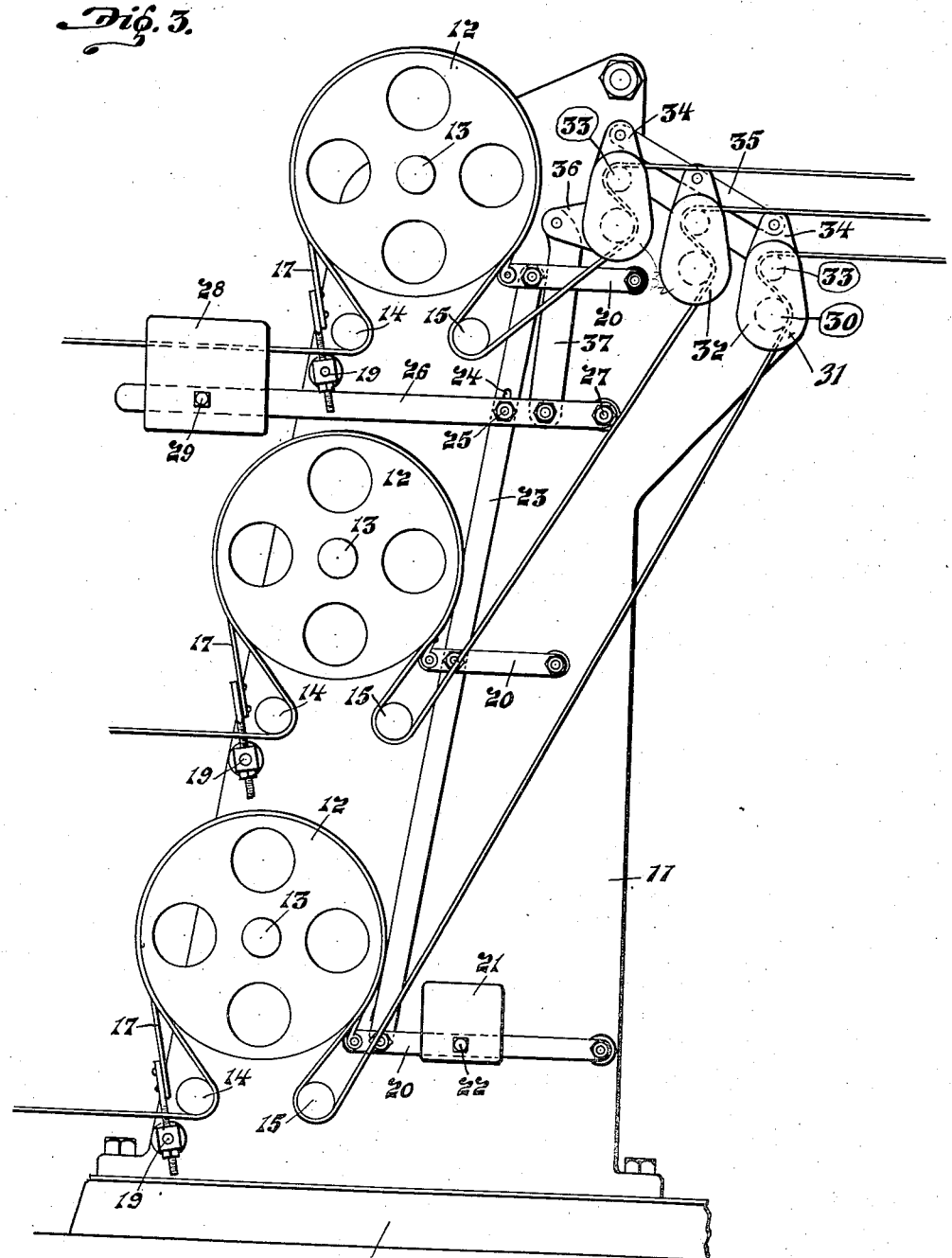

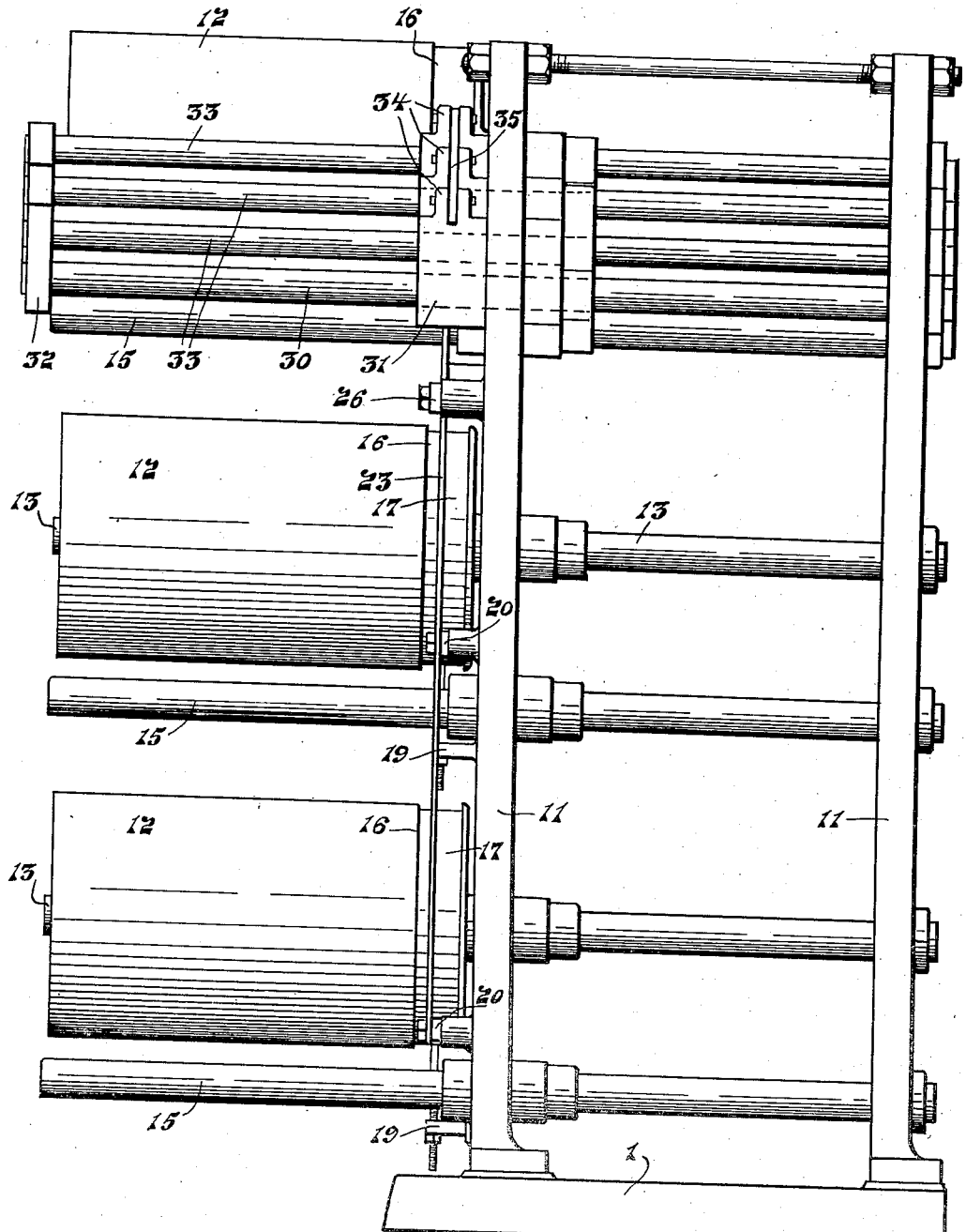

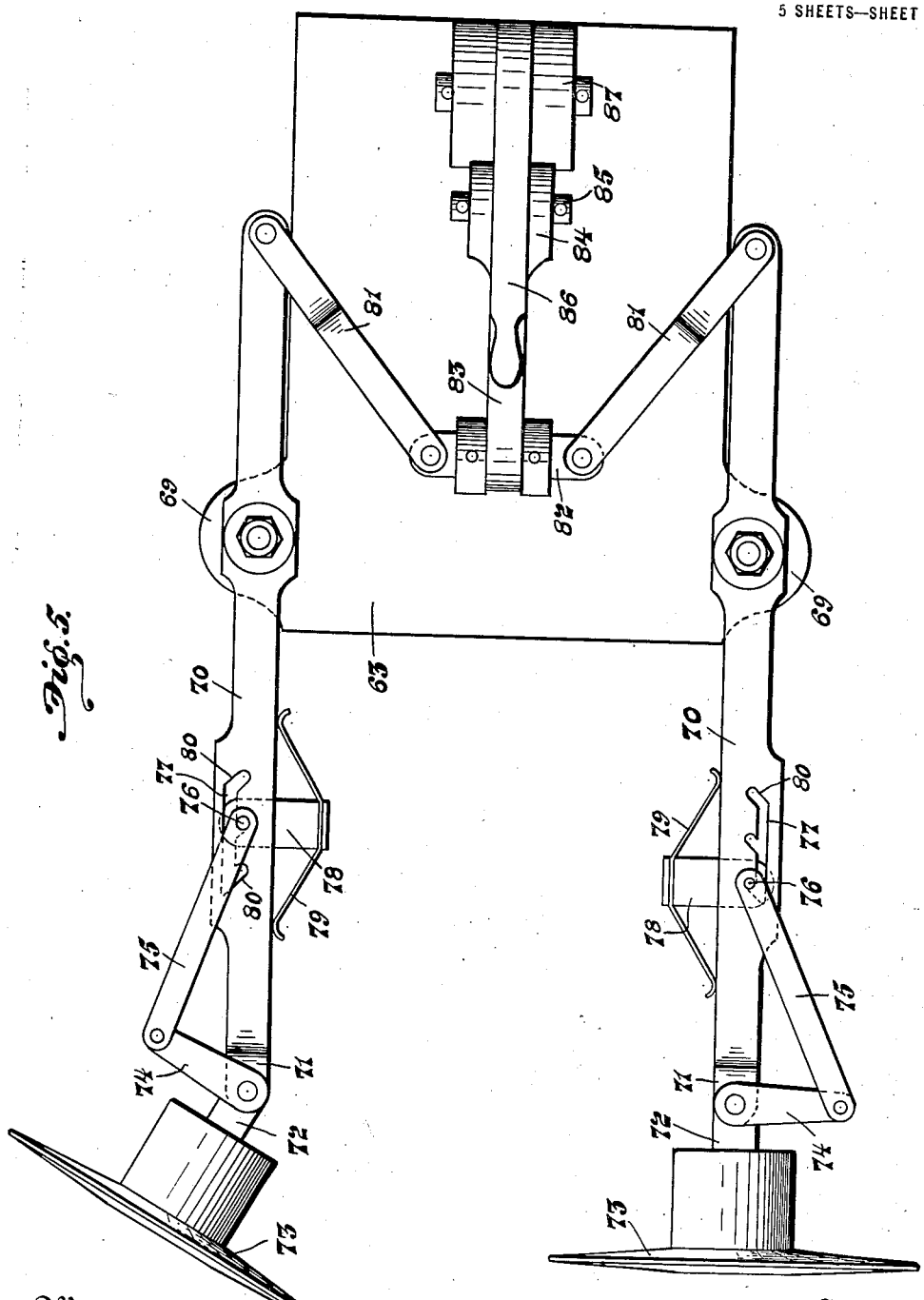

UNITED STATES PATENT OFFICE.

FRANK H. GROVE, OF COLUMBIANA, OHIO.

WEB-TENSIONING DEVICE FOR TIRE-MAKING MACHINES.

1,218,763.

Specification of Letters Patent. Patented Mar. 13, 1917.

Application filed December 16, 1915. Serial No. 67,095.

*To all whom it may concern:*

Be it known that I, FRANK H. GROVE, a citizen of the United States, residing at Columbiana, in the county of Columbiana and State of Ohio, have invented a new and useful Web-Tensioning Device for Tire-Making Machines, of which the following is a specification.

This invention relates to machines for forming the outer casings for pneumatic tires, such as are used upon automobiles and the like.

The object of the present invention is to provide a machine of the character described, in which a fixed amount of tension may be placed upon each successive strip or layer of the fabric as it is fed to the annular form.

A further object is to provide means by which the amount of tension placed upon the fabric may be easily varied.

A still further object is to provide means for regulating the amount of tension placed upon the friction brakes which control the feeding of the fabric to the rotary form.

A still further object is to provide a machine by which the casings may be rapidly and efficiently manufactured.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the accompanying drawings:

Figure 1 is a side elevation of a machine constructed in accordance with my invention.

Fig. 2 is a front elevation of the same on a slightly larger scale, parts being broken away for the purpose of illustration.

Fig. 3 is an enlarged side elevation of the portion of the machine carrying the tension drums and tension regulating mechanism.

Fig. 4 is a front elevation of the same.

Fig. 5 is an enlarged plan view of the stitching mechanism.

Fig. 6 is a perspective view of the edging and trimming device.

Similar numerals of reference indicate corresponding parts throughout the several figures of the drawings.

The numeral 1 indicates the base upon which the several parts of the machine are mounted, said base being provided at its rear extremity with an off-set portion 2 upon which are mounted the spaced side frames 3, which carry the stock rolls upon which are the gum coated fabric strips used in the manufacture of the tire casings. In the drawings three rolls of fabric are shown carried in the frames, it being understood that it is preferable to use strips of different width in different operations of the building of a tire casing. An inclined groove 4 is formed in each of the side frames for the purpose of receiving the shaft 5 of each of the stock rolls and a horizontally disposed edge 6 is provided adjacent each of said inclined slots. This construction is to facilitate the placing of new stock rolls in the machine, as the shafts of the stock rolls may be placed upon the flat portions 6 and moved forwardly until they engage the inclined grooves 4 when they will drop into position therein. The inclined face 7 will also help to guide the stock rolls into position. An inclined groove 8 is located at the rear of each of the flat portions 6, the rear edge 9 thereof being extended above the level of the flat edge 6 and adapted to receive the roll 10 upon which is wound the material used to separate the convolutions of gum coated fabric as said material is unwound from the stock roll.

Mounted upon the base 1, forward and to the left of the structure above described is a pair of side frames 11, which carry the friction regulating mechanism and friction drums, said friction drums being located in the path of the strips of fabric unwound from the stock rolls as will be hereinafter described. Each of the friction drums 12 is mounted upon a shaft 13 journaled in the side frames 11 and preferably located in the same horizontal plane as the shafts 5 of the stock rolls, one of said friction drums being provided for each stock roll. From an inspection of Fig. 4 of the drawings it will be seen that the shafts 13 extend through the inner side frame 11 and the friction drums are mounted upon said extensions, thus locating the friction drums directly in front of the stock rolls.

Located beneath each of the friction drums 12 is a pair of rolls 14 and 15, each of said rolls being journaled in the side frames 11. Each of the friction drums is provided at its inner extremity with a peripheral groove 16 adapted to receive a brake band 17, one extremity of each brake band being adjustably secured to a pin 19 carried in the adjacent side frame 11, the other extremity of each brake band being connected to a lever 20, one of said levers, preferably the lowermost being provided with an adjustable weight 21 adapted to be adjustably secured in any desired position by means of a set screw 22, said weight being for the purpose of regulating the amount of tension upon the friction drums.

The levers 20 are pivotally connected together by means of a link 23, said link being provided with a slot 24, which engages a pin 25 carried by a lever 26, said lever being pivotally connected at 27 to the adjacent side frame and provided with a slidably adjustable weight 28 adapted to be adjustably secured in any desired position upon the lever by means of a set screw 29.

A series of tension rockers comprising rock shafts 30 are journaled through the side frames 11 and extend out to a point beyond the outer extremities of the friction drums and upon each of said shafts adjacent the outer side frame is provided an integral rock arm 31, and at the outer extremity of each of said shafts is provided an integral rock arm 32, a shaft 33 being carried between each adjacent rock arm 31 and 32. Each of the rock arms 31 is provided with an upwardly disposed extension 34 to which is pivotally connected a link 35, causing all of the tension rockers and rock arms to move in unison. The uppermost rock shaft 30 is provided with a fixed arm 36 which is pivotally connected by means of a link 37 with the lever 26.

Located in front of the side frames 11, and spaced a suitable distance therefrom, is located the housing 38, which carries the mechanism designed to rotate the annular form 39 upon which the tire casings are built. The form 39 is carried by the chuck 40, which is mounted upon the shaft 41, said shaft being journaled in suitable bearings 42 carried by the housing 38.

Upon the shaft 41 is loosely mounted the drive pulley 43, power being applied to said pulley from any suitable source. A clutch member 44 is formed integral with the pulley 43 and adapted to be engaged by the slidable clutch member 45 which is slidably mounted upon the shaft 41 and keyed to said shaft in the usual manner so as to rotate with the shaft. A bell crank lever 46 is pivoted at 47 to the housing and engages the clutch member 45, a link 48 connecting said bell crank lever with the bifurcated rock arm 49 fixedly mounted upon the shaft 50, forward and rearwardly extending treadles 51 and 52 being fixedly mounted upon said shaft for the purpose of rocking the shaft in either direction. Formed integral with the pulley 43 is a pinion 53 which engages with the gear 54, said gear being fixedly mounted upon the countershaft 55, which is journaled in suitable bearings in the housing. A pinion 56 is also fixedly mounted upon the counter-shaft 55 and meshes with the gear 57 which is loosely mounted upon the shaft 41, said gear being provided with a clutch member 58 adapted to be engaged by the slidable clutch member 45.

In the manufacture of tire casings such as referred to in this application, the casings are made up of strips of gum coated fabric, preferably cut on the bias and placed in successive layers upon the revolving form, the fabric being stretched in the operation of forming the tire. As is well understood by those skilled in the art the different layers are formed of strips of varying width and for this purpose a plurality of stock rolls are provided upon the present device each roll comprising a quantity of fabric of a different width than the other rolls. Thus a strip of the fabric from one roll is placed upon the form, the fabric being cut the proper length to form a complete layer and the end of this strip is then allowed to hang idly over the particular shaft 33 over which said strip is passed and the next succeeding layer of fabric is taken from the proper strip of fabric. The path of each strip of fabric through the device is substantially the same, the fabric passing from the stock roll around the proper shaft 14 and adjacent drum and shaft 15 and then around the proper shaft 30 and 33 from where the end of the strip is carried to the rotating core or form. As shown in Fig. 1 the fabric from the lowermost stock roll is being placed upon the form. In the position in which the parts of the device are shown in Fig. 1 it will be seen that the strip of fabric connected to the core cannot be passed through the device and wound upon the core until sufficient pull has been put upon said fabric to tilt the rocking frames forwardly to a point where the weighted lever 26 will be raised sufficiently to bring the pin 25 to the upper extremity of the slot 24, thus picking up the link 23 and releasing the tension from the tension drums sufficiently to allow the fabric to be wound upon the core.

During the operation of stretching the strips of fabric and winding them in successive layers upon the revolving core, the pedal 52 would be depressed driving the core at a comparatively slow rate of speed. After each of the layers of fabric has been placed upon the core or form the pedal 51 is depressed driving the core or form at a comparatively high rate of speed in order to better use the stitching wheels.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. A machine of the character described, comprising a frame, a power driven annular form mounted in said frame, a tension rocker mounted in said frame, a friction drum rotatably mounted in said frame, a brake band located around said friction drum, one extremity of said brake band being connected to said frame, a weighted lever pivotally mounted upon said frame, a second weighted lever pivotally mounted upon said frame, a link pivotally connected to said first named weighted lever and provided with a slot, a pin carried by said second named weighted lever and normally located at the lower extremity of said slot, the free extremity of said brake band being connected to said link, means connecting said rocker to said second named lever and a stock roll rotatably mounted in said frame, the fabric from said stock roll being arranged to pass around said friction drum, and around said rocker, the extremity of said fabric being attached to said annular form.

2. A machine of the character described, comprising a frame, a power driven annular form mounted in said frame, a rocker mounted in said frame, a pair of spaced rock arms carried by said rocker, a shaft spaced from said rock shaft and carried between said spaced rock arms, a friction drum mounted in said frame, a brake band located around said friction drum, one extremity of said brake band being connected to said frame, a weighted lever pivotally mounted upon said frame, a second weighted lever pivotally mounted upon said frame, a link pivotally connected to said first named weighted lever and provided with a slot, a pin carried by said second named weighted lever and normally located at the lower extremity of said slot, the free extremity of said brake band being connected to said link, a third rock arm carried by said rock shaft, a second link pivotally connecting said last named rock arm with said last named weighted lever and a stock roll rotatably mounted in said frame, the fabric from said stock roll being arranged to pass around said friction drum and around said rock shaft and over said last named shaft, the extremity of said fabric being attached to said annular form.

3. A machine of the character described, comprising a frame, a power driven annular form mounted in said frame, a tension rocker, a friction drum rotatably mounted in said frame, a brake band passed around said friction drum, one end of said brake band connected to said frame, a weighted lever pivotally mounted upon said frame, a link operatively connected to the free end of said brake band, and provided with a slot, a pin carried by said weighted lever and normally located at the lower extremity of said slot, a weight operatively connected to the lower end of said link, a rocker mounted in said frame, means connecting said rocker to said lever, and a stock roll rotatably mounted in said frame, the fabric from said stock roll arranged to pass around said friction drum and around said rocker, the extremity of said fabric being attached to said annular form.

In testimony that I claim the above, I have hereunto subscribed my name.

FRANK H. GROVE.